United States Patent Office 3,325,569
Patented June 13, 1967

3,325,569
HALOGEN-CONTAINING PHOSPHONATES
Gaetano F. D'Alelio, 2011 E. Cedar St.,
South Bend, Ind. 46617
No Drawing. Filed July 30, 1965, Ser. No. 476,190
10 Claims. (Cl. 260—932)

This application is a continuation-in-part of copending application Ser. No. 215,261, filed Aug. 7, 1962, now abandoned.

This invention is related to a new class of compounds. More specifically it relates to new compounds having flame-resistant properties, some of which compounds are polymerizable monomers. It also relates to polymers produced from such monomers. More particularly, it relates to halogenated-phosphonate esters.

It has been known for some time that certain diallyl phosphonate polymers are of the self-extinguishing type, and it was assumed that this property is due to the presence of the phosphorus atom. This assumption was shown to be incorrect by comparing a number of phosphonates for this property (JACS, 76, 2195 (1954)), and it was shown that diallyl phenyl phosphonate, which contains 13% phosphorus had good flame resistant properties, whereas triallyl phosphate, $PO(OCH_2CH=CH_2)_3$, which contains 14.2% phosphorus, and diallyl phosphite, $$HO—P(OCH_2CH=CH_2)_2$$

which contains 19.2% phosphorus, have very poor flame resistance.

It is an object therefore, of this invention to prepare compounds having very good or excellent flame-resistant properties, including certain polymerizable monomers. It is a further object of this invention to prepare flame-resistant polymers and copolymers from such monomers. These objects are accomplished by the preparation and use of the halogen-containing aromatic phosphonate esters of this invention.

The halogenated phosphonate esters of this invention contain at least one halogen atom attached directly to the aromatic nucleus preferably chlorine or bromine, and have the phosphonate group attached to the aromatic nucleus by a methylene radical. This methylene radical is represented as $—CX_2—$, in which X is preferably hydrogen, but can also be halogen, preferably chlorine or bromine. Such methylene radicals are $—CH_2$, $—CHCl—$, $—CCl_2—$, $—CHBr—$, etc.

The halogenated phosphonate esters of this invention are represented by the formula

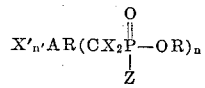

in which formula:

Ar is a polyvalent aromatic nucleus;

R is a hydrocarbon radical of no more than 20 carbon atoms, preferably no more than 12 carbon atoms and preferably alkyl, alkenyl, aryl, alkaryl, aralkyl, cycloalkyl and cyclocloalkenyl, or a derivative thereof having only no more than two derivative groups therein and each of said derivative groups being either chlorine or bromine;

X is preferably hydrogen, or halogen, preferably chlorine or bromine;

X′ represents halogen, preferably chlorine or bromine;
$n$ is an integer having a value of 1–4 and $n'$ is an integer having a value of 1–5.

Z is OH, OR or $—NR''_2$;

R″ is hydrogen or a hydrocarbon radical of no more than 20 carbon atoms as defined above for R.

Where Z in the above formula represents OH, it is intended that the various metal, ammonium and substituted ammonium, e.g. $NR''_3$, salts are included as the equivalents thereof.

For optimum flame-resistance, it is preferred that the sum of halogen and phosphorus atoms amounts to at least 21 percent by weight of the compound. The compounds of this invention are found to be particularly effective by virtue of having at least one halogen atom attached to the aromatic nucleus. In addition halogen atoms can be included in the OR radical and in the $CX_2$ radical.

Typical polyvalent radicals represented by Ar include: phenylene ($—C_6H_4—$), naphthylene ($—C_{10}H_6—$), diphenylene ($—C_6H_4C_6H_4—$), diphenylenemethane

diphenylene-ethane ($—C_6H_4C_2H_4C_6H_4—$), phenylene-oxy-phenylene ($—C_6H_4OC_6H_4—$), phenylene-sulfo-phenylene ($—C_6H_4SC_6H_4—$) and phenylene-amino-phenylene ($—C_6H_4NHC_6H_4—$), etc. It is also intended to include by the above terms obvious equivalents of these radicals, for example those having one or two alkyl radicals, preferably lower alkyl radicals of no more than 12 carbon atoms, such as tolylene, methylnaphthylene, dimethylnaphthylene, propyldiphenylene, etc. Moreover also included are those derivatives in which additional hydrogen atoms of the respective aromatic nuclei can be replaced by halogen atoms or the methylene phosphonate radical of the above general formula up to the limit indicated by $n$ and $n'$.

The hydrocarbon and halogen-substituted hydrocarbon radicals represented by R are illustrated by the following typical groups: methyl, ethyl, propyl, amyl, decyl, dodecyl, stearyl, oleyl, allyl, vinyl, crotyl, octenyl, phenyl, diphenyl, naphthyl, tolyl, ethylphenyl, diethylphenyl, methylnaphthyl, phenylethyl, benzyl, cyclohexyl, cyclohexenyl, cyclopentyl, methylcyclohexyl, vinylcyclohexyl, chlorophenyl, dichlorophenyl, bromophenyl, chloronaphthyl, chlorodiphenyl, dichloronaphthyl, chlorethyl, bromoethyl, chloropropyl, chloroallyl, chlorobenzyl, bromobenzyl, methylchlorophenyl, chlorocyclohexyl, dichlorocyclohexyl, etc. The halogenated hydrocarbon groups are sufficiently effective without any more than two halogen atoms substituted in the R group.

Typical Z groups, in addition to OR groups having the R groups illustrated above, are OH, including various metallic ammonium and substituted ammonium salts thereof, and the various amino groups of the formula $—NR''_2$ such as amino and the various substituted amino groups such as methyl, dimethyl, ethyl, propyl, butyl, dibutyl, octyl, dodecyl, allyl, stearyl, phenyl, diphenyl, phenyl methyl, tolyl, naphthyl, cyclopentyl, phenethyl, benzyl, dibenzyl, etc.

The compounds of this invention are readily prepared by the well-known Arbuzov reaction, that is by reacting a suitable phosphite $P(OR)_3$ ester with an aromatic halogen compound of the formula: $X'_nArCX_3$, in which at least one X is halogen. The reaction requires no special conditions and proceeds readily at room temperature and higher.

A few typical examples of this reaction are:

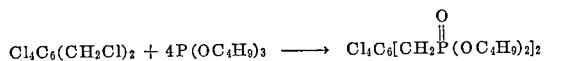

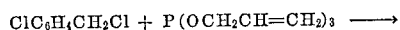

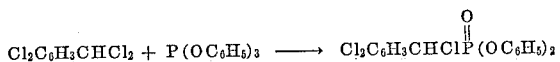

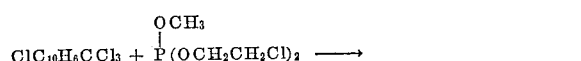

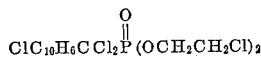

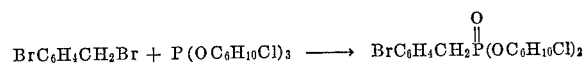

In addition to the compounds shown below in the examples, other typical compounds of this invention include the following:

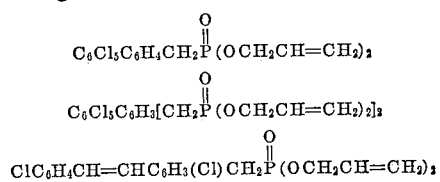

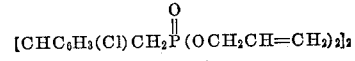

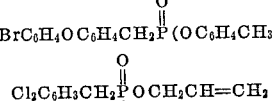

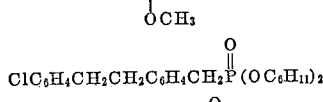

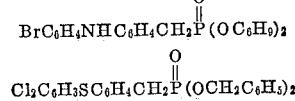

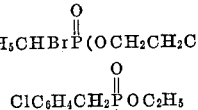

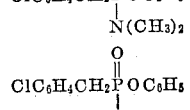

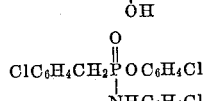

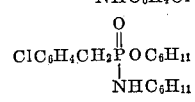

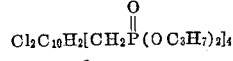

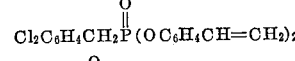

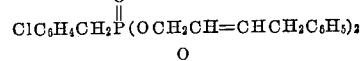

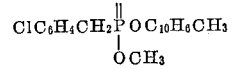

The invention is best illustrated by the following examples. These examples are given for illustrative purposes are not intended to restrict the invention or the manner in which it can be practiced. Parts and percentages, unless specified otherwise, are given by weight.

EXAMPLE I

One hundred sixty-two (162) parts of p-chlorobenzyl chloride, 404 parts of triallyl phosphite and 0.5 part of dinitro-o-cresol are heated 10 hours at 90° C. in a suitable reactor and the reaction product distilled at 10 mm. pressure to remove excess triallyl phosphite, leaving a relatively pure product of

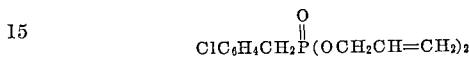

which may be used as such, or it may be distilled at reduced pressure of 1.5 mm. and the fraction boiling at 143–153° C. collected. On analysis for chlorine and phosphorus, this product gives values of 12.39% Cl and 10.72% P, which are in good agreement with the theoretical calculated values of 12.46% Cl and 10.8% P.

When 494 parts of trimethallyl phosphite are substituted for the triallyl phosphite of this example, then there is obtained the compound $$ClC_6H_4CH_2\overset{O}{\underset{\|}{P}}(OCH_2\overset{CH_3}{\underset{|}{C}}=CH_2)_2$$

whereas when 494 parts of tributenyl phosphite are used, there is obtained the compound

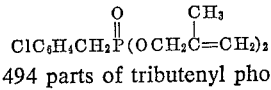

and when 520 parts of tri-(2-chloroallyl) phosphite are used, there is obtained the derivative

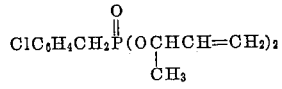

Also, when 380 parts of trivinyl phosphite are used instead of the triallyl phosphite, the corresponding

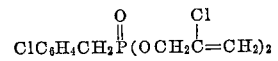

is obtained.

EXAMPLE II

The procedure of Example I is repeated using triallyl phosphite individually with (a) 196.5 parts of dichlorobenzyl chloride
(b) 231.0 parts of trichlorobenzyl chloride
(c) 265.5 parts of tetrachlorobenzyl chloride
(d) 300.0 parts of pentachlorobenzyl chloride and there is obtained, after removal of the excess triallyl phosphite, the following compounds, respectively, (a) $Cl_2C_6H_3CH_2\overset{O}{\underset{\|}{P}}(OCH_2CH=CH_2)_2$ (b) $Cl_3C_6H_2CH_2\overset{O}{\underset{\|}{P}}(OCH_2CH=CH_2)_2$ (c) $Cl_4C_6HCH_2-\overset{O}{\underset{\|}{P}}(OCH_2CH=CH_2)_2$ (d) $Cl_5C_6CH_2\overset{O}{\underset{\|}{P}}(OCH_2CH=CH_2)_2$

EXAMPLE III

Two hundred parts of otho-chloro-para-xylyl dichloride and 50 parts of triallyl phosphite are reacted by the procedure of Example I, and after removal of the excess paraxylyl chloride there is obtained as a residue the compound

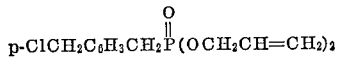

EXAMPLE IV

Two hundred forty (240) parts of commercially available "polychloromethyl naphthalene" having an average of 3 aromatic chlorine atoms in the naphthalene nucleus, $Cl_3C_{10}H_4CH_2Cl$, are reacted with 410 parts of triallyl phosphite by the procedure of Example I and there is obtained an undistilled viscous residue of the compound

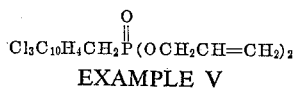

EXAMPLE V

Example I is repeated using 312 parts of tetrachloroxylyl dichloride (prepared by the chlorination of

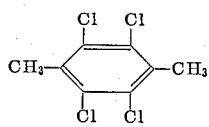

in the presence of ultraviolet light) instead of p-chlorobenzyl chloride, and there is obtained the compound

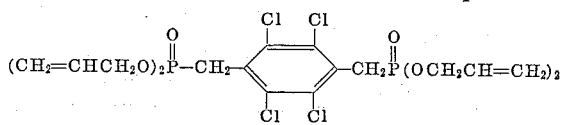

EXAMPLE VI

Example I is repeated using monomethyl diallyl phosphite instead of triallyl phosphite, and the same compound,

is obtained.

EXAMPLE VII

Example V is repeated using monoallyl dimethyl phosphite instead of triallyl phosphite, and there is obtained the compound

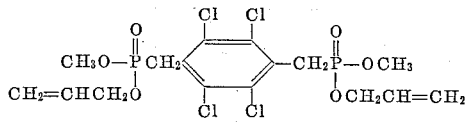

When diallyl monophenyl phosphite or monomethylmono-phenylmono-allyl phosphite is used instead of triallyl phosphite, there is obtained the compound

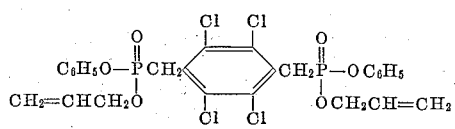

EXAMPLE VIII 2,2'-dichloro-4,4'-di-(chloromethyl)biphenyl (prepared by the chloromethylation of 2,2'-dichloro-biphenyl) by the procedure given in Organic Reactions I, 62 (1942), 322 parts are reacted with 810 parts of triallyl phosphite according to the procedure of Example I and there is obtained

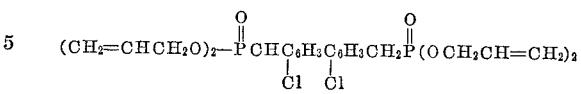

EXAMPLE IX

Example VIII is repeated using 340 parts of 3,3'-dichloro-4,4'-dichloromethyl dephenyl oxide (prepared by the chloromethylation of 3,3'-dichloro-diphenyl oxide by the procedure given in Organic Reactions, I, 62 (1942)) instead of the biphenyl compound and there is obtained the compound

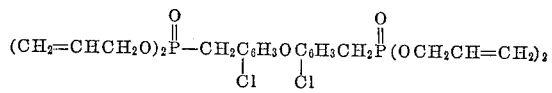

whereas when an equivalent amount of the corresponding diphenyl amine, and the corresponding diphenylsulfide respectively (prepared by chloromethylating the corresponding diphenyl amine or sulfide instead of the dichloro diphenyl oxide) are used, the corresponding compounds are obtained, respectively:

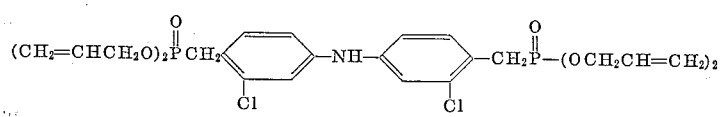

and

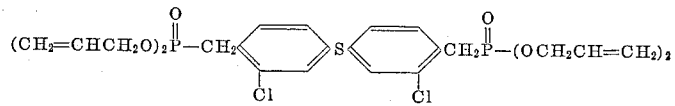

EXAMPLE X

One hundred (100) parts of each of these monomers is mixed individually with 1 part of benzoyl peroxide and heated at 65° C. for 4 days, and self-extinguishing, insoluble, infusible polymers are obtained in all cases. Other initiators such as lauroyl peroxide, tertiary butyl hydroperoxide, tertiary butyl perbenzoate, bis-azo-isobutyryl nitrile, etc. are also effective polymerizing agents. Insoluble, infusible polymers are also obtained when initiation is produced by ultraviolet light, or by ionizing radiation from Van der Graaf or linear electron or particle acceleration or from cobalt or similar sources.

The polymerization can be interrupted before gelation occurs or is performed in the presence of radical chain transfer agents such as dodecyl mercaptan, chloroform, carbon tetrachloride, styrene dimer and the like, so that soluble, fusible polymers can be isolated by precipitation, by the addition of a non-solvent for the polymer such as methanol, or by removal of the unpolyermized monomer from the mass under reduced pressure in the presence of an inhibitor such as dinitro-o-cresol.

EXAMPLE XI

Copolymers of monomers of this invention are illustrated by the use of styrene, vinylacetate, and methyl methacrylate monomers illustrative comonomers of the vinyl, $CH_2=CH-$, and vinylidene, $CH_2=C<$ types.

Fifty (50) parts of each of these monomers are mixed with 50 parts of

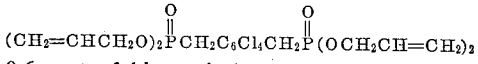

and 0.6 part of bis-azo-isobutyryl nitrile and heated at 50° C. for 24 hours, 60° C. for 24 hours, and 100° C. for 72 hours. In all cases clear, insoluble, infusible polymers of excellent flame-resistant properties are obtained.

EXAMPLE XII

This example illustrates the copolymerization of the monomers of this invention with vinylene compounds, —HC=CH—, as represented by the following compounds: 144 parts of dimethyl maleate, 98 parts of maleic anhydride, 78 parts of fumaryl nitrile, and 86 parts of vinylene carbonate are each dissolved in 300 parts of

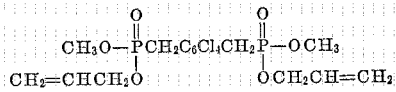

containing 5 parts of tertiary-butyl perbenzoate and heated according to the schedule of Example X and flame-retardant, insoluble, infusible copolymers are obtained. The copolymer with maleic anhydride exhibits ion exchange properties. Ion exchange resins of higher capacity are prepared by polymerizing 90–95 parts of acrylic acid or 90–95 parts of itaconic anhydride or 90–95 parts of vinyl benzene sodium sulfonate with 5–10 parts of the monomer of this and preceding examples.

EXAMPLE XIII

Example X is repeated using 800 parts of dimethyl-monoallyl phosphite instead of triallyl phosphite and there is obtained

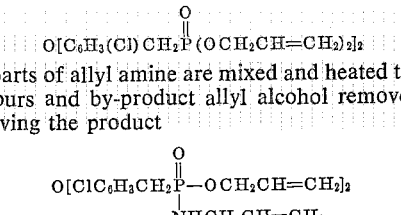

which is polymerized readily by the procedure of Example X.

EXAMPLE XIV

One hundred five (105) parts of

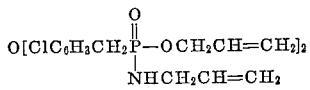

and 29 parts of allyl amine are mixed and heated to 50° C. for 4 hours and by-product allyl alcohol removed at 10 mm. leaving the product $$O[ClC_6H_3CH_2\overset{O}{\underset{NHCH_2CH=CH_2}{\overset{\|}{P}}}-OCH_2CH=CH_2]_2$$

When other amines such as ethanol amine, butylamine, aniline, chloronaniline, cyclohexyl amine and benzyl amine are used instead of allyl amine, then the corresponding amides are obtained, all of which are readily polymerized by the method of Example XI to flame-retardant polymers.

EXAMPLE XV

Example I is repeated using 600 parts of methyl di(-allylphenyl) phosphite instead of triallyl phosphite, and there is obtained the product

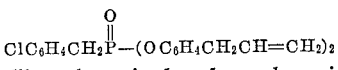

which is readily polymerized and copolymerized according to the previous examples to flame-retardant cross-linked polymers.

EXAMPLE XVI

Two hundred eighty-three (283) parts of

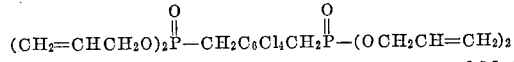

and 800 parts of methanol containing 40 parts of NaOH are refluxed for 1 hour, following which the excess methanol is removed under 15 mm. pressure and the residue washed with heptane, dried in a vacuum chamber, and there is obtained a residue corresponding to the formulas

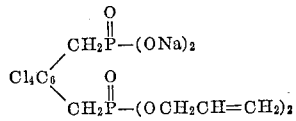

and

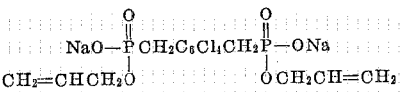

The monomer is soluble in water, and when polymerization is initiated with potassium persulfate or other water soluble initiators yields a water insoluble gel. When KOH, LiOH, or other alkalies or alkaline earth metals are used the corresponding salts are obtained. Other metal derivatives such as iron, copper, nickel, zirconium, etc., may be readily prepared by metathesis of the sodium potassium or lithium salts with heavy metal salts such as zinc chloride, copper chloride, vanadium sulfate, etc.

The water soluble salts are used for the preparation of ion exchange resins per se or for impregnating porous structures for ion exchange resin use, such as refractory structures to produce ion exchange beds, membranes, etc.

These soluble monomers are also useful for impregnating other porous structures to impart flame-resistance as well as for other uses, such as paper, wood, leather, cotton, and the like, to produce as well, mold-resistant product, as well as for tanning.

A ten percent aqueous solution of the monomer of this example containing one percent ammonium persulfate based on the monomer content is used to impregnate soft pine until at least seven percent of the monomer is retained in the wood, and the impregnated product dried at room temperature for 48 hours, then at 50° C. for 24 hours, and at 75–85° C. for 24 hours, and an insoluble, infusible polymer is formed in the wood. The wood is then immersed in a 5% aqueous cupric sulfate solution for 72 hours, removed, washed, with water and dried: and on analysis is found to contain substantial amounts of bound copper which is not readily extracted by water. The treated board shows excellent resistance to wood-destroying fungi and has good flame retardant properties which are easily increased by increasing the content of the polymer in the wood.

In a similar way untanned leather is impregnated with the sodium salt of the monomer, the monomer polymerized in situ, and the sodium ions exchanged for zinc, zirconium, or chromium to produce tanned leathers.

The free acids are obtained by treating the sodium, potassium, etc. salts of these monomers with inorganic acids such as sulfuric acid or phosphoric acid, and the ammonium and amine salts are readily prepared from the free acids by addition of aqueous or alcoholic or other solvent solutions of ammonia or amines to the acids, such as methyl amine, butyl amine, diethanol amine, triisopropyl amine, aniline, pyridine, etc. These ammonium and amine salts may be used in a manner similar to the alkaline and alkaline earth salts.

EXAMPLE XVII

Three portions of fifty parts each of

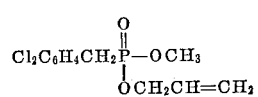

containing 3 parts of benzoyl peroxide are mixed with 50 parts each of methyl methacrylate, vinyl acetate and ethyl acrylate and heated for 24 hours at 50° C., 24 hours at 80° C. and 48 hours at 100° C., and a soluble, fusible polymer is obtained. When the copolymers are dissolved in benzene, precipitated with methanol, isolated by filtration and dried, they are found, on a quantitative test, to contain both phosphorus and chlorine and to be more flame-retardant than homopolymers of methyl methacrylate, vinyl acetate, or ethyl acrylate.

The monomer compounds of this invention, in addition to being suitable for the preparation of polymers, can also be used as intermediates for producing various other compounds. For example, they can be halogenated to produce the chloro or bromo derivatives as illustrated by the reaction,

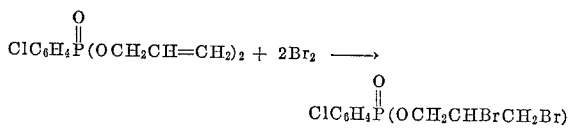

which reaction is applicable generally to all the compounds of this invention, and these derivatives have great utility as gasoline additives and flame extinguishing additives for paper, cloth, wood, polymers such as polystyrene, etc.

Furthermore, these monomers can be epoxidized with $H_2O_2$ in the presence of an acid or cation exchange resin, or with $(CH_3CO)_2O_2$ as illustrated by

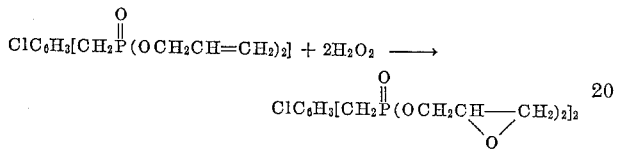

which reaction is applicable broadly to the compounds of this invention. These derivatives have great utility as stabilizers for polymers, as hydrohalide acceptors, as intermediates in the preparation of adhesives for metals, wood and other substances, for the preparation of varnishes, paints, etc.

The esters of this invention can also be reacted with glycols to make fire-retardent components for polyurethane resins. For example:

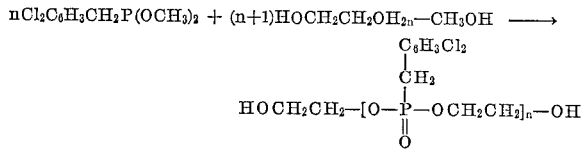

This can be used to replace part of the polyglycol component reacted with polyisocyanates to make polyurethanes and thereby impart fire-retardant properties.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A halogenated phosphonate compound having the formula $$X'_{n'}Ar(CX_2\overset{O}{\overset{\|}{P}}-OR)_n$$
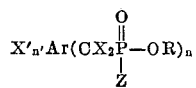

wherein:

Ar is a polyvalent aromatic radical selected from the class consisting of phenylene, naphthylene, diphenylenemethane, diphenylene-ethane, phenylene-oxy-phenylene, phenylene-sulfo-phenylene, and phenylene-amino-phenylene;

X' is a halogen atom selected from the class consisting of chlorine and bromine;

X is a radical selected from the class consisting of hydrogen, chlorine and bromine;

n is an integer having a value of 1–4;

n' is an integer having a value of 1–5;

R is a radical having no more than 20 carbon atoms selected from the class consisting of alkyl, alkenyl aryl, aralkyl, alkaryl, cycloalkyl and cycloalkenyl and derivatives of said groups in which there are no more than two derivative groups and each of said derivative groups is selected from the class consisting of chlorine and bromine, and at least one R group per molecule representing an alkenyl group;

Z is a radical selected from a class consisting of OR, OH and $-NR''_2$;

R'' is a radical having no more than 20 carbon atoms selected from the class consisting of hydrogen, alkyl, alkenyl, aryl, aralkyl, alkaryl, cycloalkyl, and cycloalkenyl.

2. A compound of the formula

3. A compound of the formula

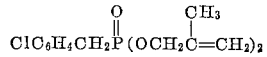

4. A compound of the formula

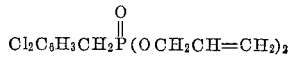

5. A compound of the formula

6. A compound of the formula

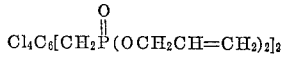

7. A compound of the formula

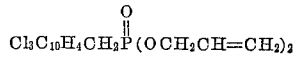

8. A compound of the formula

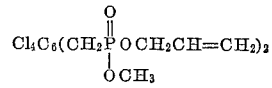

9. A compound of the formula

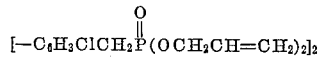

and

10. A compound of the formula

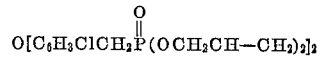

References Cited

UNITED STATES PATENTS

| | | | |
|---|---|---|---|
| 2,720,535 | 10/1955 | Kosolapoff | 260—961 |
| 2,928,859 | 3/1960 | Preston et al. | 260—961 X |
| 3,177,208 | 4/1965 | Stilz et al. | 260—932 X |

CHARLES B. PARKER, *Primary Examiner.*

RICHARD L. RAYMOND, *Assistant Examiner.*